(12) United States Patent
Harmon et al.

(10) Patent No.: US 11,707,010 B2
(45) Date of Patent: Jul. 25, 2023

(54) SYSTEM AND METHOD FOR MONITORING THE OPERATIONAL STATUS OF TOOLS OF AN AGRICULTURAL IMPLEMENT

(71) Applicant: CNH Industrial America LLC, New Holland, PA (US)

(72) Inventors: Joshua David Harmon, Lititz, PA (US); Christopher A. Foster, Mohnton, PA (US)

(73) Assignee: CNH Industrial America LLC, New Holland, PA (US)

( * ) Notice: Subject to any disclaimer, the term of this patent is extended or adjusted under 35 U.S.C. 154(b) by 929 days.

(21) Appl. No.: 16/442,154

(22) Filed: Jun. 14, 2019

(65) Prior Publication Data

US 2020/0390023 A1    Dec. 17, 2020

(51) Int. Cl.
*A01B 71/02*        (2006.01)
*A01B 63/00*        (2006.01)
(Continued)

(52) U.S. Cl.
CPC ............ *A01B 71/02* (2013.01); *A01B 63/002* (2013.01); *A01B 63/02* (2013.01); *A01B 71/06* (2013.01)

(58) Field of Classification Search
CPC ......... A01B 71/02; A01B 71/06; A01B 63/02; A01B 63/002; A01B 63/112
See application file for complete search history.

(56) References Cited

U.S. PATENT DOCUMENTS 2,113,666 A    4/1938 Suman
2,124,965 A    7/1938 Lind
(Continued)

FOREIGN PATENT DOCUMENTS

CN    102289644 A    12/2011
CN    103630282 A    3/2014
(Continued)

OTHER PUBLICATIONS

PCT international Search Report and Written Opinion issued in corresponding Application PCT/US2020/037007, dated Sep. 30, 2020 (12 pages).
(Continued)

*Primary Examiner* — Tara Mayo
(74) *Attorney, Agent, or Firm* — Rebecca Henkel; Rickard DeMille

(57) ABSTRACT

A system for monitoring the operational status of ground-engaging tools of an agricultural implement. The system includes a frame and an assembly including an attachment structure configured to be coupled to the frame and a ground-engaging tool pivotably coupled to the attachment structure at a pivot point. The system further includes a shear pin at least partially extending through both the attachment structure and ground-engaging tool to prevent pivoting of the ground-engaging tool about the pivot point. Additionally, the system includes a sensor configured to detect a load applied through a pivot member extending through at least one of the frame or assembly at any pivot point between the frame and the ground engaging tool. The system further includes a controller, communicatively coupled to the sensor, configured to determine a change in the working condition of the shear pin based on the detected load applied through the pivot member.

16 Claims, 5 Drawing Sheets

(51) Int. Cl.
  *A01B 63/02* (2006.01)
  *A01B 71/06* (2006.01)

(56) References Cited

U.S. PATENT DOCUMENTS

| | | |
|---|---|---|
| 3,704,459 A | 11/1972 | Young |
| 4,246,456 A | 1/1981 | Leonard |
| 4,934,611 A | 6/1990 | Lewis |
| 5,017,912 A | 5/1991 | Willis |
| 5,142,914 A | 9/1992 | Kusakabe et al. |
| 5,195,597 A | 3/1993 | Yeomans |
| 5,870,689 A | 2/1999 | Hale et al. |
| 5,923,270 A | 7/1999 | Sampo et al. |
| 6,041,582 A | 3/2000 | Tiede et al. |
| 6,226,597 B1 | 5/2001 | Eastman et al. |
| 6,276,916 B1 | 8/2001 | Schad et al. |
| 6,556,143 B2 | 4/2003 | Noah |
| 7,009,123 B2 | 3/2006 | Banville et al. |
| 7,324,882 B2 | 1/2008 | Heinsey et al. |
| 7,328,625 B2 | 2/2008 | Sundermeyer et al. |
| 7,353,723 B2 | 4/2008 | Lardy et al. |
| 7,392,123 B2 | 6/2008 | Heinsey et al. |
| 7,412,898 B1 | 8/2008 | Smith et al. |
| 7,463,035 B2 | 12/2008 | Merchant et al. |
| 7,747,396 B2 | 6/2010 | Murad et al. |
| 7,889,840 B2 | 2/2011 | Vasudevan et al. |
| 7,973,671 B2 | 7/2011 | Cloutier et al. |
| 8,024,980 B2 | 9/2011 | Arms et al. |
| 8,494,810 B2 | 7/2013 | Goldfine et al. |
| 8,596,134 B2 | 12/2013 | Mekid et al. |
| 8,600,611 B2 | 12/2013 | Seize |
| 8,600,627 B2 | 12/2013 | Beck et al. |
| 8,706,447 B2 | 4/2014 | Iannone |
| 8,768,657 B2 | 7/2014 | Goldfine et al. |
| 8,810,370 B2 | 8/2014 | Tillotson et al. |
| 9,119,347 B2 | 9/2015 | Bonte et al. |
| 9,144,199 B2 | 9/2015 | Ritter et al. |
| 9,194,376 B2 | 11/2015 | Ritter et al. |
| 9,429,485 B1 | 8/2016 | Cavallaro |
| 9,483,674 B1 | 11/2016 | Fink et al. |
| 9,547,783 B2 | 1/2017 | Lewis et al. |
| 9,566,939 B1 | 2/2017 | Rivera et al. |
| 9,638,756 B2 | 5/2017 | Srinivasan et al. |
| 9,645,061 B2 | 5/2017 | Hsieh |
| 9,677,592 B2 | 6/2017 | Bernhardt |
| 9,677,593 B2 | 6/2017 | Hsieh |
| 9,952,129 B2 | 4/2018 | Kondo |
| 10,025,893 B2 | 7/2018 | Andersson et al. |
| 10,066,920 B2 | 9/2018 | Klasen |
| 10,294,636 B2 | 5/2019 | Leslie et al. |
| 10,316,881 B2 | 6/2019 | Brown |
| 2001/0048369 A1 | 12/2001 | Noah |
| 2006/0003846 A1 | 1/2006 | Burger et al. |
| 2008/0046130 A1 | 2/2008 | Faivre et al. |
| 2013/0180742 A1* | 7/2013 | Wendte ............ A01B 63/1145 172/4 |
| 2016/0055280 A1 | 2/2016 | Devoy et al. |
| 2017/0196160 A1 | 7/2017 | Bjerketvedt et al. |
| 2017/0321552 A1 | 11/2017 | Gustafsson |
| 2018/0073542 A1 | 3/2018 | Saigo et al. |
| 2018/0155132 A1 | 6/2018 | Li et al. |
| 2018/0238768 A1 | 8/2018 | Lajnef et al. |
| 2019/0107138 A1 | 4/2019 | Brown |
| 2020/0337202 A1 | 10/2020 | Hertzog et al. |
| 2020/0390023 A1 | 12/2020 | Harmon et al. |
| 2021/0059098 A1 | 3/2021 | Kovach |
| 2021/0102856 A1 | 4/2021 | Glovier et al. |
| 2021/0102984 A1 | 4/2021 | Stanhope et al. |
| 2021/0132573 A1 | 5/2021 | Sporrer et al. |

FOREIGN PATENT DOCUMENTS

| | | |
|---|---|---|
| CN | 204166662 U | 2/2015 |
| CN | 204256887 U | 4/2015 |
| CN | 104614775 A | 5/2015 |
| EP | 1557588 A1 | 7/2005 |
| EP | 2201833 A1 | 6/2010 |
| GB | 1271308 A | 4/1972 |
| GB | 2264619 A | 9/1993 |
| JP | S 57191472 A | 11/1982 |
| JP | H 04204394 A | 7/1992 |
| JP | 2014109457 A | 6/2014 |
| JP | 6259203 B2 | 1/2018 |
| WO | WO 2009/116966 | 9/2009 |
| WO | WO 2018/030942 | 2/2018 |
| WO | WO 2018/073791 | 4/2018 |
| WO | WO 2018/223231 | 12/2018 |

OTHER PUBLICATIONS

"Bringing Internet of Things to Bolted Connections" StrainLabs Dated Oct. 17, 2018 (4 pages) https://strain-labs.com/bringing-internet-of-things-to-bolted-connections/.
"Real Time Shank Bolt Detection" Shank Patrol Dated Oct. 22, 2018 (3 pages) https://shankpatrol.com/.
Mechanica Systems "Shear Pin Load Sensor" Dated Jul. 29, 2019 ( 2 pages) http://www.mechanics.net/shear-pin-load-sensor.html.
"Why Settle for Only One or Two Axes?" Design News 63.14 Cahners Publishing Co. Dated Oct. 6, 2008 (2 pages) http://dialog.proquest.com/professional/docview/743564886?accountid=157282.

* cited by examiner

SYSTEM AND METHOD FOR MONITORING THE OPERATIONAL STATUS OF TOOLS OF AN AGRICULTURAL IMPLEMENT

FIELD

The present disclosure generally relates to agricultural implements and, more particularly, to systems and methods for monitoring the operational status of ground-engaging tools of an agricultural implement.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools configured to penetrate the soil to a particular depth. In this respect, the ground-engaging tools may be pivotally coupled to a frame of the tillage implement. In many instances, biasing elements, such as springs, are used to exert biasing forces on the ground-engaging tools. This configuration may allow the ground-engaging tools to be biased towards a desired position relative to the frame, thereby maintaining the particular depth of soil penetration as the agricultural work vehicle pulls the tillage implement through the field. Additionally, this configuration may also permit the ground-engaging tools to pivot out of the way of rocks or other impediments in the soil, thereby preventing damage to the ground-engaging tools or other components on the implement.

In addition to such biasing elements, tillage implements often utilize a shear-bolt mounting arrangement in which shear pins or bolts are used to couple the ground-engaging tools to the frame or associated attachment structure. In such an embodiment, the shear pins serve to protect the ground-engaging tools from excessive loading that would otherwise substantially damage or break the tools. For instance, such a configuration may allow a ground-engaging tool to pivot out of the way of rocks or other impediments in the soil when the adjustability provided by the associated biasing element is insufficient.

When a shear pin breaks during the performance of an agricultural operation, the associated ground-engaging tool typically will no longer be capable of effectively working the soil. However, with current implement configurations, it is often very difficult for the operator to determine when one or more of the shear pins have failed. As such, an extensive portion of the field may have been worked before discovering the broken shear pin(s).

Accordingly, an improved system and method for monitoring the operational status of ground-engaging tools, such as a change in the working condition of a shear pin associated with a ground-engaging tool, as the agricultural implement is moved across a field would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for monitoring the operational status of ground-engaging tools of an agricultural implement. The system includes a frame and an assembly including an attachment structure configured to be coupled to the frame and a ground-engaging tool. Moreover, the ground-engaging is pivotably coupled to the attachment structure at a pivot point. The system further includes a shear pin at least partially extending through both the attachment structure and ground-engaging tool to prevent pivoting of the ground-engaging tool about the pivot point when the shear pin is in an operable working condition. Additionally, the system includes a sensor configured to detect a load applied through a pivot member extending through at least one of the frame or assembly at any pivot point between the frame and the ground engaging tool. The system further includes a controller communicatively coupled to the sensor. The controller is configured to determine a change in the working condition of the shear pin based on the detected load applied through the pivot member.

In another aspect, the present subject matter is directed to a method of monitoring the operational status of a ground-engaging tool pivotally coupled to a frame of an agricultural implement at a pivot point. The method includes monitoring, with a computing device, a load applied through a pivot member at any pivot point between the frame and the ground-engaging tool as the agricultural implement is moved across a field during the performance of an agricultural operation. Additionally, the method includes comparing, with the computing device, the monitored load to a predetermined load threshold defined by the ground-engaging tool or an actively determined load threshold based on one or more loads applied to one or more ground-engaging tools. Further, the method includes determining, with the computing device, a working condition of a shear pin at least partially extending through the ground-engaging tool based at least in part on the comparison between the monitored load and the predetermined load threshold or the actively determined load threshold.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
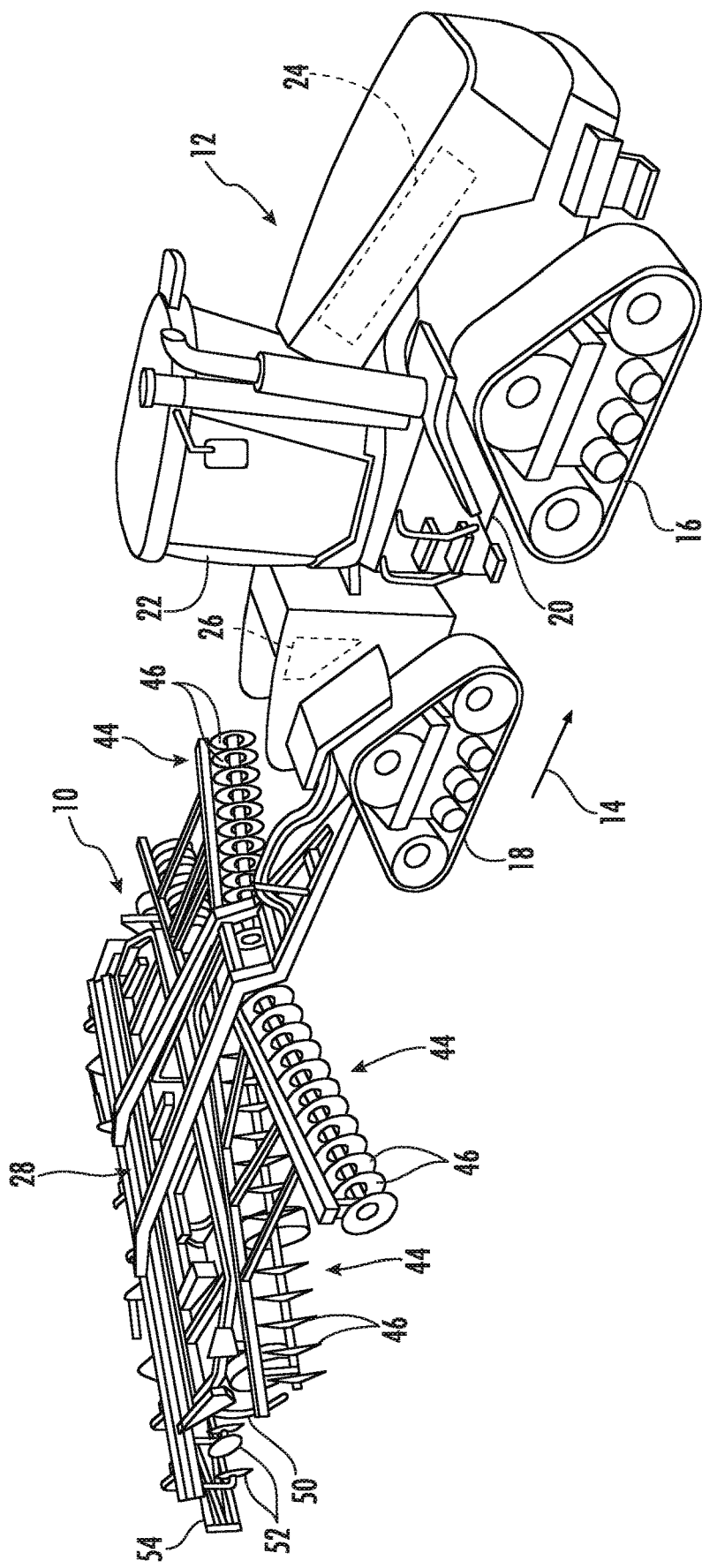
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the operational status of ground-engaging tools of an agricultural implement. Specifically, in several embodiments, the disclosed system may be utilized to monitor the operational status of ground-engaging tools, such as shanks, configured to be pivotably coupled to a frame of an agricultural implement, in which a shear pin or bolt extends through the tool to prevent pivoting of the tool relative to the frame or a component attached to the frame during normal loading conditions. For example, in accordance with aspects of the present subject matter, the disclosed system may include a sensor configured to detect a load applied through a pivot member associated with a given ground-engaging tool at or adjacent to the pivot point at which the tool is pivotally coupled to the implement frame or any other pivot point between the frame and the given ground-engaging tool. As will be described below, a controller of the system may be configured to monitor the load based on the data received to determine a change in a working condition of the ground-engaging tool. For instance, the controller may be configured to utilize the monitored load to determine when the shear pin associated with the tool has sheared off or otherwise failed. In such instance, the controller may, for example, be configured to alert an operator of the agricultural implement of the change in the working condition of the ground-engaging tool to allow the operator to take whatever action he/she deems appropriate.

Figure 2:
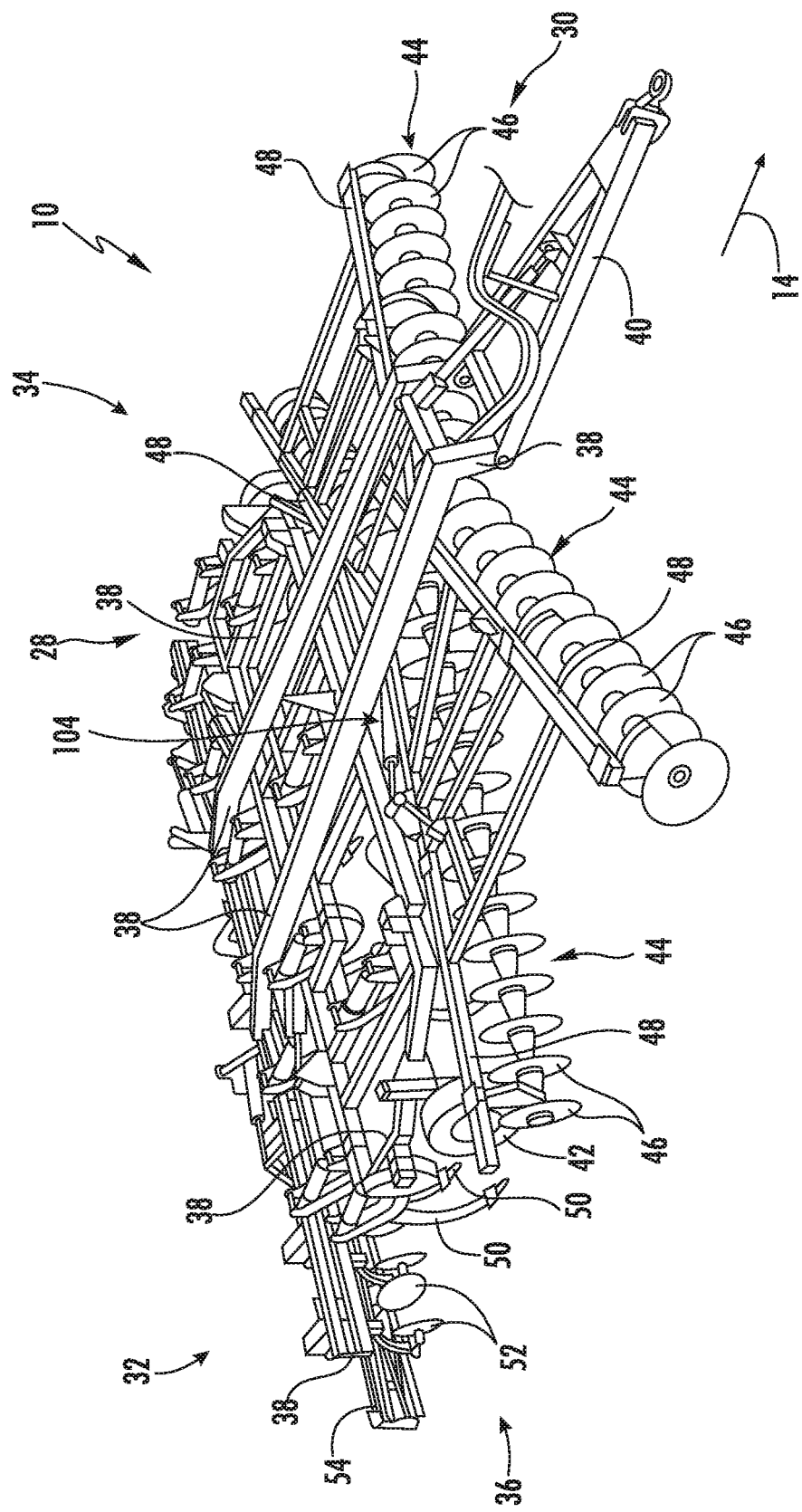
FIG. 2 illustrates an alternative perspective view of an agricultural implement in accordance with aspects of the present subject matter, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices (e.g., a user interface 102) for permitting an operator to control the operation of one or more components of the work vehicle 12 and/or one or more components of the implement 10. Additionally, as is generally understood, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown particularly in FIG. 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown in FIG. 2) may be coupled to the frame 28 to facilitate towing the implement 10 in the direction of travel 14.

In several embodiments, one or more ground-engaging tools may be coupled to and/or supported by the frame 28. In such embodiments, the ground-engaging tool(s) may, for example, include one or more ground-penetrating tools. More particularly, in certain embodiments, the ground-engaging tools may include one or more shanks 50 and/or disc blades 46 supported relative to the frame 28. In one embodiment, each shank 50 and/or disc blade 46 may be individually supported relative to the frame 28. Alternatively, one or more groups or sections of the ground-engaging tools may be ganged together to form one or more ganged tool assemblies, such as the disc gang assemblies 44 shown in FIGS. 1 and 2.

As illustrated in FIG. 2, each disc gang assembly 44 includes a toolbar 48 coupled to the implement frame 28 and a plurality of disc blades 46 supported by the toolbar 48 relative to the implement frame 28. Each disc blade 46 may, in turn, be configured to penetrate into or otherwise engage the soil as the implement 10 is being pulled through the field. As is generally understood, the various disc gang assemblies 44 may be oriented at an angle relative to the direction of travel 14 to promote more effective tilling of the soil. In the embodiment shown in FIGS. 1 and 2, the implement 10 includes four disc gang assemblies 44 supported on the frame 28 at a location forward of the shanks 50, such as by including two forward disc gang assemblies 44 and two rear disc gang assemblies 44 positioned adjacent to the forward end 30 of the implement 10. However, it should be appreciated that, in alternative embodiments, the implement 10 may include any other suitable number of disc gang assemblies 44, such as more or fewer than four disc gang assemblies 44. Furthermore, in one embodiment, the disc gang assemblies 44 may be mounted to the frame 28 at any other suitable location, such as adjacent to its aft end 32. Moreover, in several embodiments, the implement 10 may include a plurality of disc gang actuators 104 (one is shown in FIG. 2), with each actuator 104 being configured to move or otherwise adjust the orientation or position of one of the disc gang assemblies 44 relative to the implement frame 28.

It should be appreciated that, in addition to the shanks 50 and the disc blades 46, the implement frame 28 may be configured to support any other suitable ground-engaging tools. For instance, in the illustrated embodiment, the frame 28 is also configured to support a plurality of leveling blades 52 and rolling (or crumbler) basket assemblies 54. In other embodiments, any other suitable ground-engaging tools may be coupled to and supported by the implement frame 28, such as a plurality closing discs.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration.

Figure 3:
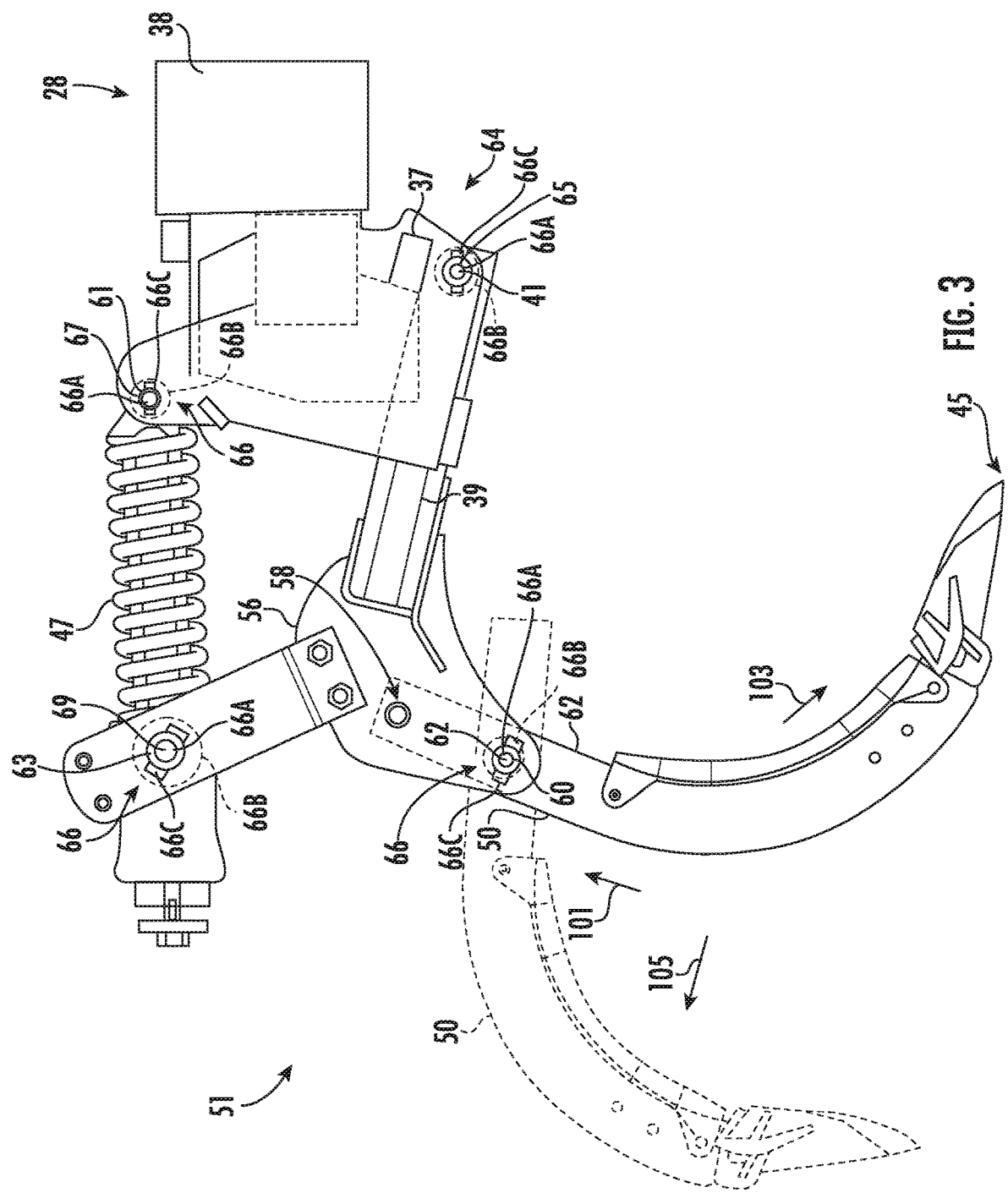
FIG. 3 illustrates a side view of one embodiment of a shank assembly including a shank pivotally coupled to an implement frame in accordance with aspects of the present subject matter, particularly illustrating a shear pin extending through the shank.

Referring now to FIG. 3, a side-view of a shank assembly 51 including one of the shanks 50 of the tillage implement 10 described above with reference to FIGS. 1 and 2 is illustrated in accordance with aspects of the present subject matter. As shown in the illustrated embodiment, the shank assembly 51 includes both the shank 50 and associated attachment structure (e.g., first and second attachment members 39, 56) for pivotally coupling the shank 50 to the implement frame 28 (e.g., at a first pivot point 41). As shown in FIG. 3, the shank 50 may include a tip end 45 that is configured to penetrate into or otherwise engage the ground as the implement 10 is being pulled through the field. In one embodiment, the shank 50 may be configured as a chisel. However, one of ordinary skill in the art would appreciate that the ground-engaging tool may be configured as a sweep, tine, or any other suitable ground-engaging tool. It should also be appreciated an auxiliary attachment may also be coupled to the shank 50 at its tip end 45, such as a point attachment.

As shown in FIG. 3, in several embodiments, a biasing element 47 may be coupled between the frame 28 and the shank assembly 51 to bias the shank 50 to a predetermined ground-engaging tool position (e.g., a home or base position) relative to the frame 28. In general, the predetermined ground-engaging tool position may correspond to a ground-engaging tool position in which the shank 50 penetrates the soil to a desired depth. In several embodiments, the predetermined ground-engaging tool position may be set by a mechanical stop 37. In operation, the biasing element 47 may permit relative movement between the shank 50 and the frame 28. For example, the biasing element 47 may be configured to bias the shank assembly 51 including the shank 50 to pivot relative to the frame 28 in a first pivot direction (e.g., as indicated by arrow 103 in FIG. 3) until an end 64 of the first attachment member 39 of the shank assembly 51 contacts the stop 37. The biasing element 47 may also allow the shank 50 to pivot away from the predetermined ground-engaging tool position (e.g., to a shallower depth of penetration), such as in a second pivot direction (e.g., as indicated by arrow 101 in FIG. 3) opposite the first pivot direction 103, when encountering rocks or other impediments in the field. As shown in FIG. 3, the biasing element 47 may be configured as a spring. It should be recognized, however, the biasing element 47 may be configured as an actuator or any other suitable biasing element.

As further illustrated in FIG. 3, the shank 50 may further be pivotably coupled to attachment structure of the shank assembly 51 at a second pivot point 60 to allow pivoting of the shank 50 relative to a component of the attachment structure about such point 60 independent of the pivotal motion allowed about the first pivot point 41 via the operation of the biasing element 47. More particularly, as shown in the illustrated embodiment, the shank 50 is pivotally coupled to the second attachment member 56 of the attachment structure at the second pivot point 60, which, in turn, is coupled to the frame 28 at the first pivot point 41 via the first attachment member 39. In such an embodiment, the shank 50 may be coupled the second attachment member 56 via an associated pivot member 62 (e.g., a pivot bolt or pin) extending through both the shank 50 and the attachment member 56 at the second pivot point 60. Additionally, as shown, the biasing element 47 may be pivotably coupled to the frame 28 at a third pivot point 61 and pivotably coupled to the shank assembly 51 at a fourth pivot point 63. Moreover, an associated pivot member 65, 67, 69 (e.g., a pivot bolt or pin) may extend through each of the pivot points 41, 61, 63, respectively.

Additionally, as shown in FIG. 3, the shank assembly 51 may further include a shear pin or bolt 58 at least partially extending through both the attachment member 56 and the shank 50 at a location separate from the pivot point 60 defined between such components. For instance, in the illustrated embodiment, the shear pin 58 is positioned above the pivot point 60 defined between the shank 50 and the adjacent attachment member 56. In general, the shear pin 58 may be configured to prevent rotation of the shank 50 relative to the attachment member 56 when the shear pin 58 is in an operable working condition, for instance when the shear pin 58 has not sheared or otherwise failed. In one embodiment, the shear pin 58 may correspond to a mechanical pin designed such that the pin breaks when a predetermined force is applied through the pin. For instance, the shear pin 58 may be designed to withstand normal or expected loading conditions for the shank 50 and fail when the loads applied through the pin 58 exceed or substantially exceed such normal/expected loading conditions.

During normal operation, the tip end 45 of the shank 50 may encounter impediments in the field causing the shank assembly 51 to rotate about the first pivot point 41 in the second pivot direction 101. Typically, the shank will pivot upwards in the second pivot direction 101 about the first pivot point 41 to clear the impediment and then will return to its home or ground-engaging position via the action of the biasing element 47. However, in certain situations, the shank assembly 51 may fully rotate until the attachment structure contacts the mechanical stop 37 without clearing the impediment, in which case a significant amount of force may be transmitted through the shank assembly 51. In such a situation, the shear pin 58 may be designed to fracture, thereby allowing the shank 50 to rotate about the second pivot point 60 relative to the attachment member 56. For instance, the shank 50 may rotate about the second pivot point 60 (as indicated by arrow 105 in FIG. 3) to the shank position indicated by dashed lines in FIG. 3.

Referring still to the example embodiment of FIG. 3, in accordance with aspects of the present subject matter, an operational status sensor 66 may be installed at or adjacent to any pivot point (e.g., pivot points 41, 60, 61, 63) between the frame 28 and the shank 50. For instance, the operational status sensor 66 may be installed at or adjacent to the pivot point 60 defined between the shank 50 and the adjacent attachment member 56 to detect the load transmitted between such components. For instance, in several embodiments, the sensor 66 may be configured to detect the load applied through the pivot member 62 coupled between the shank 50 and the adjacent attachment member 56 at the pivot point 60 as the implement 10 is being moved across the field to perform an associated agricultural operation (e.g., a tillage operation). In several embodiments, operational status sensor(s) 66 may be installed at or adjacent to one or more of the pivot points 41, 61, 63 defined between the first attachment member 39 and the frame 28, between the biasing element 47 and the frame 28, and between the biasing element 47 and the second attachment member 56, respectively. Moreover, the sensor(s) 66 may be configured to detect the load transmitted between such components.

For example, as described below, the sensor(s) 66 may be coupled to one or more of the pivot member 62, 65, 67, 69 and/or between the pivot member(s) 62, 65, 67, 69 and the shank 50, the second attachment member 56, the first attachment member 39, the frame 28, and/or the biasing element 47 to allow force data associated with the load on the pivot member(s) 62, 65, 67, 69 to be captured. As will be described below, the load detected by the sensor(s) 66 may then be transmitted to a corresponding system controller 82 (FIG. 4) to allow the controller 82 to determine the working condition or a change in the working condition of the shear pin 58 as the associated agricultural operation is being performed. It should also be appreciated that, in general, the operational status sensor(s) 66 may correspond to any suitable sensor configured to provide an indication of the load applied through the pivot member(s) 62, 65, 67, 69. Additionally, the operational status sensor(s) 66 are not restricted to the pivot members and pivot points illustrated in FIG. 3, but may be installed at or adjacent to pivot members of any other pivot points defined between the shank 50 and the frame 28.

As shown, FIG. 3 illustrates various examples of different optional operational status sensors 66 (e.g., sensors 66A, 66B, and 66C) that may be used to monitor the load acting on or through the pivot member(s) 62, 65, 67, 69. Thus, it should be appreciated that the shank assembly 51 need not include each of the sensors 66 shown in FIG. 3. For instance, embodiments of the disclosed shank assembly 51 may only include one of the sensors 66 described with reference to FIG. 3 to monitor the load acting on the pivot member(s) 62, 65, 67, 69. However, in other embodiments, a combination of the sensors 66 may be used to determine the load acting on the pivot member(s) 62, 65, 67, 69.

In one embodiment, as illustrated in FIG. 3, the operational status sensor 66 may be configured as a load pin assembly 66A configured to detect the load acting on the pivot member(s) 62, 65, 67, 69. Specifically, any of the pivot members 62, 65, 67, 69 and the sensor 66 may together form at least part of the load pin assembly 66A. As is generally understood, a load pin generally operates by sensing the force that is applied through the pin, such as by using internal strain gauges installed at the center of the pin. As such, a single component load pin assembly 66A may be used to both pivotably couple the shank 50 to the second attachment member 56, the first attachment member 39 to the frame 28, the biasing element 46 to the frame 28, or the biasing element 47 to the second attachment member 56 and detect the load applied between such components at the adjacent pivot points 60, 41, 61, 63. As another example, in an additional or alternative embodiment, the operational status sensor 66 may be configured as a load sensor 66B that is coupled to the pivot member(s) 62, 65, 67, 69 and/or that is coupled between and the components pivotably coupled together with such pivot member(s) 62, 65, 67 69. For instance, the load sensor 66B may be coupled between the pivot member 62 and the attachment member 56 and/or the shank 50 to detect the load transmitted through the pivot member 62. For example, the load sensor 66B may detect the load acting directly on the pivot member 62 or the load acting between the pivot member 62 and the adjacent components (e.g., the attachment member 56 and/or the shank 50) at or adjacent to the location of the pivot point 60. As yet another example, as shown in FIG. 3, the operational status sensor 66 may be configured as a strain gauge 66C coupled to the pivot member(s) 62, 65, 67, 69 to detect the load acting directly on the pivot member(s) 62, 65, 67, 69.

Figure 4:
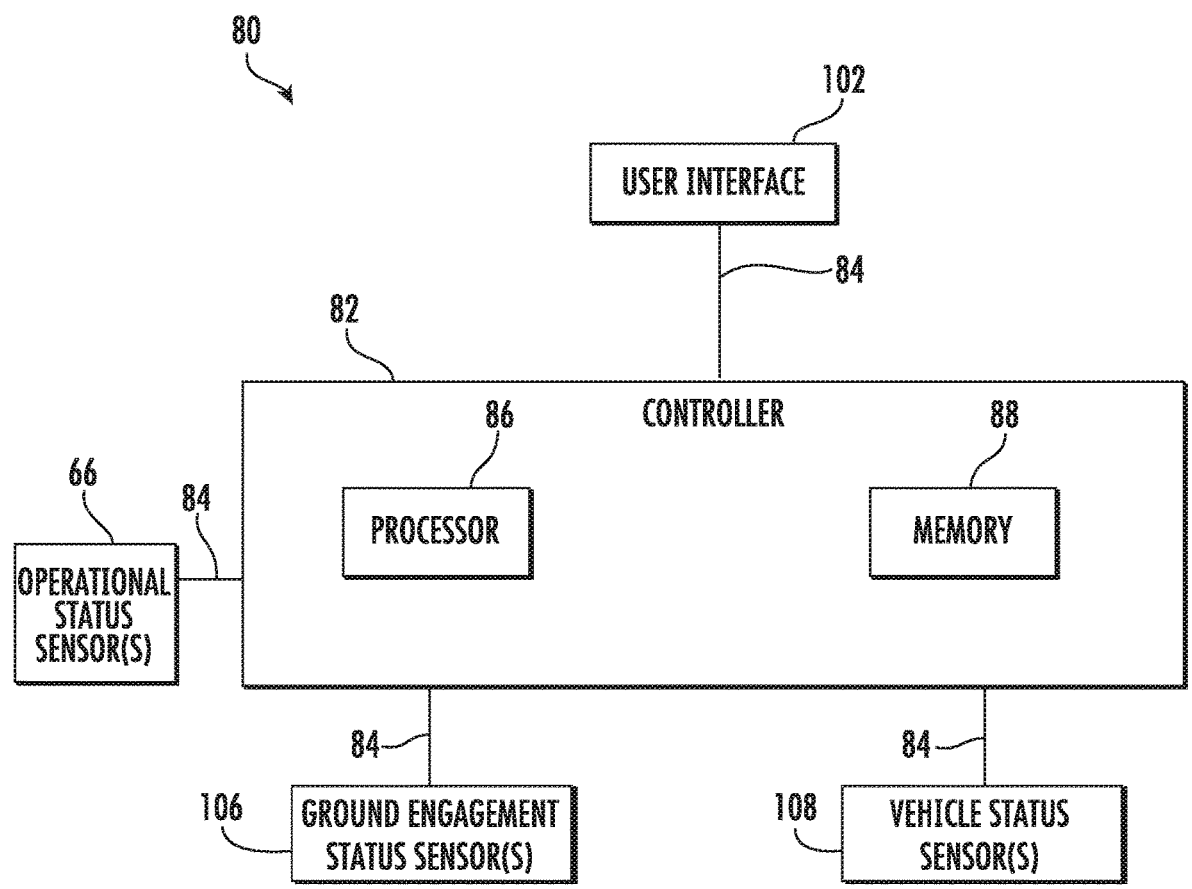
FIG. 4 illustrates a schematic view of one embodiment of a system for monitoring the operational status of a ground-engaging tool of an agricultural implement in accordance with aspects of the present subject matter.

Referring now to FIG. 4, a schematic view of one embodiment of a system 80 for monitoring the operational status of a ground-engaging tool of an agricultural implement is illustrated in accordance with aspects of the present subject matter. In general, the system 80 will be described herein with reference to the embodiment of the implement 10 described above with reference to FIGS. 1 and 2 and, in particular, the shank assembly 51 described above with reference to FIG. 3. However, it should be appreciated that, in general, the disclosed system 80 may be utilized with any suitable implement having any suitable implement configuration to allow the operational status of a ground-engaging tool to be monitored. Moreover, it should be appreciated that aspects of the disclosed system 80 may also be utilized with any other suitable ground-engaging tools of a given agricultural implement.

As shown, the system 80 may generally include a controller 82 configured to be communicatively coupled (via one or more communicative links 84) to one or more of the operational status sensors 66 installed relative to the ground-engaging tools of the associated implement. For instance, with reference to the embodiment of the shank assembly 51 described above, an operational status sensor(s) 66 (e.g., one or more of the sensors 66A, 66B, and 66C described in FIG. 3) may be installed in operative association with each of a plurality of different shank assemblies 51 of the agricultural implement 10. In such an embodiment, the controller 82 may be communicatively coupled to each of such sensors 66, thereby allowing the controller 82 to monitoring the load applied through the pivot member(s) 62, 65, 67, 69 associated with each shank 50 at the respective pivot point(s) 60, 41, 61, 63 (FIG. 3) defined between such shank 50, its adjacent attachment structure, its biasing element 47, and/or the frame 28.

In general, the controller 82 may comprise any suitable processor-based device known in the art, such as a computing device or any suitable combination of computing devices. Thus, in several embodiments, the controller 82 may include one or more processor(s) 86 and associated memory device(s) 88 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 88 of the controller 82 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 88 may generally be configured to store suitable computer-readable instructions that, when implemented by the processor(s) 86, configure the controller 82 to perform various computer-implemented functions, such as one or more aspects of the method 200 described below with reference to FIG. 5. In addition, the controller 82 may also include various other suitable components, such as a communications circuit or module, one or more input/output channels, a data/control bus and/or the like.

It should be appreciated that the controller 82 may correspond to an existing controller of the implement 10 or the work vehicle 12 or the controller 82 may correspond to a separate processing device. For instance, in one embodiment, the controller 82 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

As illustrated in FIG. 4, the system 80 may generally include one or more sensors configured to allow the controller 82 to determine the implement 10 and shank assembly(ies) 51 are in a working condition. For example, one or more ground engagement status sensors 106 or vehicle status sensors 108 may be communicatively coupled (via one or more communicative links 84) to the controller 82. For instance, a ground engagement sensor(s) 106 may be provided in operative association with each of a plurality of different shank assemblies 51 of the agricultural implement 10. The ground engagement sensor(s) 106 may allow the controller 82 to monitor the position of the shank assemblies 51 to determine that the shank assemblies 51 are in an operating position (e.g., such that each shank 50 is configured to be in the predetermined ground-engaging tool position). In certain embodiments, the ground engagement sensor(s) 106 may include a depth sensor. However, in additional or alternative embodiments, the ground engagement sensor(s) 106 may include any sensor suitable to determine whether the shank assembly(ies) 51 is in the operating position. Further, a vehicle status sensor(s) 108 may be provided in operative association with the implement 10 and/or the work vehicle 12. The vehicle status sensor(s) 108 may allow the controller 82 to monitor the speed and/or position of the agricultural implement 10 and/or work vehicle 12 to determine whether the agricultural implement 10 is in an operating status (e.g., is moving across the field). For example, the vehicle status sensor(s) 108 may include one or more global positioning system ("GPS") or ground speed radar sensors provided in operative association with at least one of the implement 10 or work vehicle 12. However, in additional or alternative embodiments, the vehicle status sensor(s) 108 may include any sensor suitable to determine the agricultural implement 10 is in the operating status.

By capturing the load data associated with the pivot member(s) 62, 65, 67, 69 (FIG. 3) coupled between a given shank 50 and its adjacent attachment structure, between the attachment structure and the frame 28, or between the biasing element 47 and the attachment structure, respectively, the controller 82 may be configured to estimate or determine when a change in the working condition of the associated shear pin 58 (FIG. 3) occurs based on the monitored load. For instance, when the shank 50 is in an engaged position with the field and the shear pin 58 is in an operable working condition, forces imparted on the shank 50 may be transferred through the shank 50 to the pivot member(s) 62, 65, 67, 69 or any other suitable pivot member between the shank 50 and the frame 28. As such, the detected load acting on the pivot member(s) 62, 65, 67, 69 may indicate that the shear pin 58 is intact or in a working condition. However, when the force applied on the shank 50 is large enough to break or shear the shear pin 58, the shank 50 may freely rotate about the pivot point(s) 60, 41, 61, 63 defined between the shank 50, the adjacent attachment structure, the biasing element 47, and/or the frame 28. In such instance, the load applied to the pivot member(s) 62, 65, 67, 69 at such pivot point(s) 60, 41, 61, 63 may be reduced significantly.

In several embodiments, to determine when there has been a change in the working condition of the shear pin 58 from its otherwise operable working condition (e.g., due to the shear pin 58 shearing off or otherwise failing), the controller 82 may be configured to compare the monitored load applied through the pivot member(s) 62, 65, 67, 69 (as determined based on the data received by the operational status sensor(s) 66) to a load threshold. Specifically, the controller 82 may be configured to determine that there has been a change in the working condition of the shear pin 58 when the load detected by the sensor(s) 66 drops below the load threshold. In one embodiment, the load threshold may be a predetermined load threshold selected so as to correspond to a load indicative of a low-load condition at the pivot member(s) 62, 65, 67, 69. As used herein, the load acting through the pivot member(s) 62, 65, 67, 69 may be indicative of low-load condition when the load is equal to or less than 25% the expected or normal load applied through the pivot member(s) 62, 65, 67, 69 as the agricultural implement 10 is moved across the field during the performance of the associated agricultural operation. In a further embodiment, the predetermined load threshold may be selected so as to correspond to a substantially zero load. In this regard, the term "substantially zero load" may correspond to a zero load plus a given tolerance that takes into account any minimal loads that may be transmitted through the pivot member(s) 62, 65, 67, 69 following failure of the shear pin 58.

In a further embodiment, the load threshold may be an actively determined load threshold based on one or more loads applied to one or more other ground-engaging tools. For instance, other ground-engaging tool, such as adjacent shanks 50, may include associated operational status sensors 66 to detect loads transmitted through the components of the shank assembly 51. In at least one instance, the actively determined load threshold may be based on an average of the load applied through pivot member(s) 62, 65, 67, 69 communicated through sensor(s) 66 associated with each ground-engaging tool. For instance, the actively determined load threshold may be equal to 25% of the average of the load applied through the other ground-engaging tools. It should be appreciated a load threshold corresponding to an actively determined load threshold may avoid the need to calibrate the system 80. Moreover, in other embodiments, comparing the load applied through the pivot member(s) 62, 65, 67, 69 to the actively determined load threshold may indicate a deformation of the ground-engaging tool and/or a point loss of the ground-engaging tool.

As shown in FIG. 4, the system 80 may also include a user interface 102 communicatively coupled to the controller 82. In one embodiment, the user interface 102 may be configured to provide feedback (e.g., notifications associated with status of the tools being monitored (e.g., one or more of the shanks 50) to the operator of the implement 10. For instance, the controller 82 may be configured to alert the operator of a change in the working condition of one or more of the shear pins 58, such as when it is determined that a given shear pin 58 has failed due to the changed in the monitored load based on the data received from the associated sensor(s) 66, thereby allowing the operator to make determination as to whether it is necessary to stop the operation of the implement 10 to check the status of the associated shear pin(s) 58. Such notifications to the operator may be particularly advantageous in situations in which the shear pin 58 has failed, but the shank 50 has not rotated backwards relative to the adjacent attachment structure to a noticeable degree (e.g., due to friction between the shank 50 and the attachment structure). In such instances, an operator visually examining the ground-engaging tools may not recognize that one or more of the shear pins 58 are no longer in the operable working condition. Accordingly, alerting the operator of changes to the working condition of the shear pins 58 allows for accurate and timely detection of shear pin failures.

It should be appreciated that the user interface 102 may include or be associated with one or more feedback devices (not shown), such as display screens, speakers, warning lights, and/or the like, which are configured to communicate such feedback. In one embodiment, the controller 82 may be configured to generate an interface element for display to an operator on the user interface 102. In such an embodiment, the interface element may, for example, be associated with a visual indicator indicative of the working condition of tools being monitored (e.g., by indicating a change in the working condition of the shear pin 58 associated with one of the monitored tools). It should be appreciated that the controller 82 may be configured to generate a separate interface element for each shear pin 58 associated with the various ground-engaging tools of the implement 10 or may generate a single interface element representing the working condition of multiple shear pins 58. In addition, some embodiments of the user interface 102 may include one or more input devices (not shown), such as touchscreens, keypads, touchpads, knobs, buttons, sliders, switches, mice, microphones, and/or the like, which are configured to receive user inputs from the operator. In one embodiment, the user interface 102 may be positioned within the operator's cab 22 of the work vehicle 12. However, in alternative embodiments, the user interface 102 may have any suitable configuration and/or be positioned in any other suitable location.

In additional or alternative embodiments, the controller 82 may be configured to implement a control action in response to a change in the working condition of one or more of the shear pins 58. For example, the controller 82 may communicate a signal to stop movement of the work vehicle 12 and/or raise one or more of the ground-engaging tools of the implement 10. As such, by implementing the control action, the system 80 may prevent cultivation of portions of the field while one or more ground-engaging tools are not engaging the soil due to, for example, a sheared or broken shear pin(s) 58.

Figure 5:
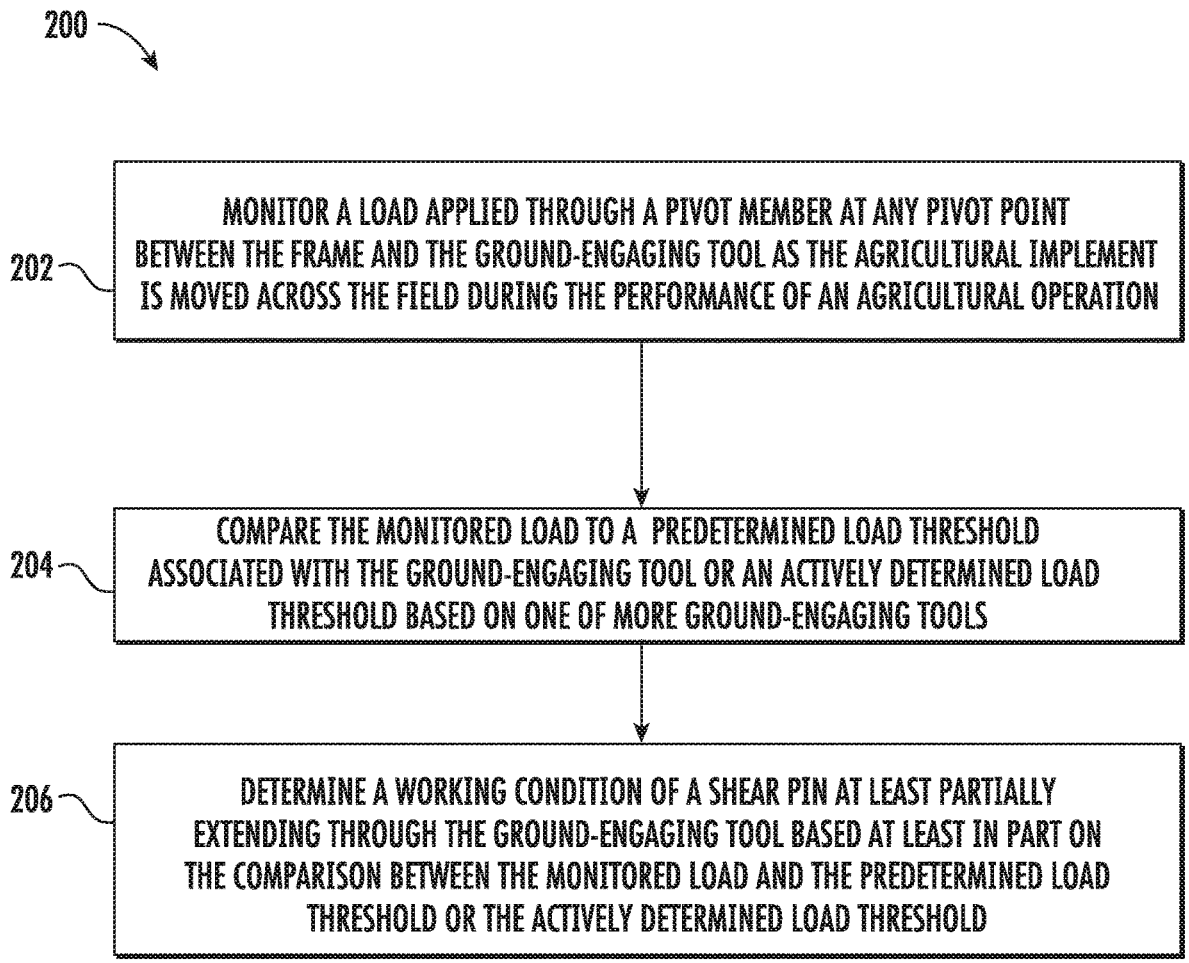
FIG. 5 illustrates a flow diagram of one embodiment of a method of monitoring the operational status of a ground-engaging tool of an agricultural implement in accordance with aspects of the present subject matter.

Referring now to FIG. 5, a flow diagram of one embodiment of a method 200 of monitoring the operational status of a ground-engaging tool of an agricultural implement depicted in accordance with aspects of the present subject matter. In general, the method 200 will be described herein with reference to the implement 10 and the system 80 described above with reference to FIGS. 1-4. However, it should be appreciated by those of ordinary skill in the art that the disclosed method 200 may generally be utilized to determine the operational status of a ground-engaging tool associated with any agricultural implement having any suitable implement configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include monitoring a load applied through a pivot member at any associated pivot point as the agricultural implement is moved across a field during the performance of an agricultural operation. For example, the ground-engaging tool may include a shank 50. In such an arrangement, monitoring the load applied through the pivot member(s) 62, 65, 67, 69 may include monitoring the load applied through the pivot member(s) 62, 65, 67, 69 as the shank 50 is being pulled through the ground during the performance of the agricultural operation. For example, as indicated above, the system controller 82 may be configured to monitor the load applied through a pivot member(s) 62, 65, 67, 69 based on sensor data received from one or more operational status sensors 66A, 66B, 66C. In at least one embodiment, prior to monitoring the load applied through the pivot member(s) 62, 65, 57, 69, the method 200 may include determining the implement 10 and shank assembly(ies) 51 are in a working condition. For example, as described above, the controller 82 may be configured to monitor the position of the shank assembly (ies) 51 based on sensor data received from one or more ground engagement status sensors 106 to determine whether the shank assembly(ies) 51 are in an operating positon (e.g., such that each shank 50 is configured to be in the predetermined ground-engaging tool position). Further, the controller 82 may be configured to monitor the position and/or speed of the agricultural implement 10 or work vehicle 12 based on sensor data received from one or more vehicle status sensors 108 to determine whether the agricultural implement 10 is in an operating status (e.g., is moving across the field).

As further shown in FIG. 5, at (204) the method 200 may include comparing the monitored load to a predetermined load threshold associated with the ground-engaging tool or an actively determined load threshold based on one or more loads applied to one or more ground-engaging tools. For instance, the predetermined load may be selected to correspond to a load indicative of a low-load condition at the pivot member(s) 62, 65, 67, 69. More particularly, in one embodiment, the low-load condition may correspond to a load equal to or less than 25% of the expected or normal load applied through the pivot member(s) 62, 65, 67, 69 during the performance of the agricultural operation. In a further embodiment, the predetermined load threshold may be selected to correspond to a substantially zero load (e.g., a zero load plus a given tolerance that takes into account any minimal loads that may be transmitted through the pivot member(s) 62, 65, 67, 69 following a failure of the shear pin 58). Moreover, the actively determined load threshold may be based on the average of loads applied through pivot members associated with adjacent ground-engaging tools of the implement 10. For instance, the actively determined load threshold may be equal to 25% of the average of the load applied through the other ground engaging tools.

Moreover, as shown in FIG. 5, at (206), the method 200 may include determining a working condition of a shear pin at least partially extending through the ground-engaging tool based at least in part on the comparison between the monitored load and the predetermined load threshold or the actively determined load threshold. Specifically, as indicated above, the system controller 82 may be configured to analyze the load applied through the pivot member(s) 62, 65, 67, 69 to determine the working condition of the associated shear pin 58. In one embodiment, determining the working condition of the shear pin 58 may include determining whether the shear pin 58 has sheared off or failed. In a further embodiment, determining the working condition of the shear pin 58 may include determining that the shear pin 58 is in an operable working condition when the monitored load exceeds the predetermined load threshold or the actively determined load threshold. In another embodiment, the method 200 may further include detecting a change in the working condition of the shear pin 58 from the operable working condition when the load monitored via the sensor(s) 66 falls below the predetermined load threshold or the actively determined load threshold.

Further, the method 200 of FIG. 8 may also include alerting an operator of the agricultural implement 10 of a change in the working condition of the shear pin 58. For instance, the method 200 may include generating an interface element for display to an operator on a user interface 102. More specifically, the system controller 82 may be configured to produce the interface element for display on the user interface 102. As indicated above, in one embodiment, the interface element may be associated with a visual indicator of the working condition of the shear pin 58. Additionally, the method 200 may include implementing a control action is response to the change in the working condition of the shear pin 58. For example, the system controller 82 may communicate a signal to stop movement of the work vehicle 12 and/or raise one or more of the ground engaging tools of the implement 10.

It is to be understood that the steps of the method 200 is performed by the controller 82 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 82 described herein, such as the method 200, is implemented in software code or instructions which are tangibly stored on a tangible computer readable medium. The controller 82 loads the software code or instructions via a direct interface with the computer readable medium or via a wired and/or wireless network. Upon loading and executing such software code or instructions by the controller 82, the controller 82 may perform any of the functionality of the controller 82 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring the operational status of ground-engaging tools of an agricultural implement, the system comprising:
   a frame;
   an assembly including an attachment structure configured to be coupled to the frame and a ground-engaging tool pivotably coupled to the attachment structure at a pivot point;
   a shear pin at least partially extending through both the attachment structure and ground-engaging tool to prevent pivoting of the ground-engaging tool about the pivot point when the shear pin is in an operable working condition;
   a sensor configured to detect a load applied through a pivot member extending through at least one of the frame or assembly at any pivot point between the frame and the ground-engaging tool; and
   a controller communicatively coupled to the sensor, wherein the controller:
   compares the detected load applied through the pivot member to a load threshold; and
   determines that the shear pin has sheared off when the detected load applied through the pivot member drops below the load threshold.

2. The system of claim 1, wherein the ground-engaging tool comprises a shank.

3. The system of claim 1, wherein the sensor and the pivot member form at least a part of a load pin assembly.

4. The system of claim 1, wherein the controller is configured to generate an interface element for display to an operator on a user interface, the interface element providing a visual indicator associated with whether the shear pin has sheared off.

5. The system of claim 1, wherein the controller determines the shear pin is in the operable working condition when the load detected by the sensor exceeds the load threshold.

6. The system of claim 1, wherein the load threshold is a predetermined load threshold or an actively determined load threshold based on one or more loads applied to one or more ground-engaging tools.

7. The system of claim 6, wherein the predetermined load threshold is equal to a substantially zero load.

8. The system of claim 1, wherein the sensor comprises at least one of a strain gauge or load sensor coupled to at least one of the pivot member, between the pivot member and the assembly, or between the pivot member and the frame.

9. A method of monitoring the operational status of a ground-engaging tool pivotally coupled to a frame of an agricultural implement at a pivot point, the method comprising:
   monitoring, with a computing device, a load applied through a pivot member at any pivot point between the frame and the ground-engaging tool as the agricultural implement is moved across a field during the performance of an agricultural operation;

comparing, with the computing device, the monitored load to a predetermined load threshold defined associated with the ground-engaging tool or an actively determined load threshold based on one or more loads applied to one or more ground-engaging tools; and determining, with the computing device, that a shear pin at least partially extending through the ground-engaging tool has sheared off when the monitored load drops below the predetermined load threshold or the actively determined load threshold.

10. The method of claim 9, further comprising:
at least one of alerting an operator of the agricultural implement when the shear pin has sheared off or implementing a control action in response to the shear pin shearing off.

11. The method of claim 9, wherein the ground-engaging tool comprises a shank, wherein monitoring the load applied through the pivot member comprises monitoring the load applied through the pivot member as the shank is being pulled through the ground during the performance of the agricultural operation.

12. The method of claim 9, wherein the pivot member forms at least a part of a load pin assembly, and wherein monitoring the load applied through the pivot member comprises detecting the load applied through the pivot member based on data received from the load pin assembly.

13. The method of claim 9, further comprising:
generating, with the computing device, an interface element for display to an operator on a user interface, the interface element associated with a visual indicator of whether the shear pin has sheared off.

14. The method of claim 9, further comprising:
determining the shear pin is in an operable working condition when the monitored load exceeds the predetermined load threshold or the actively determined load threshold.

15. The method of claim 14, wherein the shear pin is configured to prevent pivoting of the ground-engaging tool about the pivot point when the shear pin is in the operable working condition.

16. The method of claim 9, wherein monitoring the load applied through the pivot member comprises detecting the load applied through the pivot member based on data received from at least one of a strain gauge or a load sensor coupled to at least one of the pivot member, between the pivot member and an attachment structure coupled between the ground-engaging tool and the frame, between the pivot member and the ground engaging tool, or between the pivot member and the frame.

* * * * *